United States Patent
Kim et al.

(10) Patent No.: US 11,320,579 B2
(45) Date of Patent: May 3, 2022

(54) BACK LIGHT UNIT COMPRISING SHAPE MEMORY MATERIAL AND DISPLAY APPARATUS COMPRISING THE SAME

(71) Applicant: SAMSUNG ELECTRONICS CO., LTD., Suwon-si (KR)

(72) Inventors: Soon Jung Kim, Suwon-si (KR); Dae Young Kim, Suwon-si (KR); Gong Hee Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/276,219

(22) PCT Filed: May 17, 2019

(86) PCT No.: PCT/KR2019/005933
§ 371 (c)(1),
(2) Date: Mar. 15, 2021

(87) PCT Pub. No.: WO2020/085596
PCT Pub. Date: Apr. 30, 2020

(65) Prior Publication Data
US 2022/0035092 A1  Feb. 3, 2022

(30) Foreign Application Priority Data

Oct. 22, 2018  (KR) .......................... 10-2018-0126067

(51) Int. Cl.
*F21V 8/00* (2006.01)
*G02F 1/13357* (2006.01)
*G02F 1/1335* (2006.01)

(52) U.S. Cl.
CPC ......... *G02B 6/0051* (2013.01); *G02B 6/0065* (2013.01); *G02F 1/133606* (2013.01); *G02F 1/133507* (2021.01)

(58) Field of Classification Search
CPC .................. C22C 14/00; C22C 19/007; C21D 2201/01–02
See application file for complete search history.

(56) References Cited

U.S. PATENT DOCUMENTS

2013/0258565 A1   10/2013  Nishi
2016/0363723 A1*  12/2016  Choi .................... G02B 6/0091
(Continued)

FOREIGN PATENT DOCUMENTS

KR   10-2006-0014387 A   2/2006
KR       10-1237223 B1   2/2013
(Continued)

OTHER PUBLICATIONS

International Search Report dated Sep. 10, 2019 issued by the International Searching Authority in counterpart International Application No. PCT/KR2019/005933 (PCT/ISA/210).

*Primary Examiner* — Keith G. Delahoussaye
(74) *Attorney, Agent, or Firm* — Sughrue Mion, PLLC

(57) ABSTRACT

An aspect of the present disclosure provides a backlight unit with improved wrinkled phenomenon of optical sheet due to external factors such as temperature or humidity, and a display apparatus including the same. The display apparatus according to an embodiment includes: a backlight unit comprising an optical sheet; and an image forming unit configured to generate an image by transmitting or blocking light emitted from the backlight unit, and the optical sheet includes a plurality of sheets, and comprises a shape memory material in at least one of the plurality of sheets.

7 Claims, 9 Drawing Sheets

(56) References Cited

U.S. PATENT DOCUMENTS

2017/0205570 A1* 7/2017 Sugimoto ......... G02F 1/133308
2017/0205654 A1   7/2017 Iwaki et al.
2017/0315452 A1  11/2017 Hild et al.
2018/0117876 A1*  5/2018 Sohn .......................... C09J 5/06

FOREIGN PATENT DOCUMENTS

KR   10-2016-0002556 A   1/2016
KR   10-2017-0105509 A   9/2017

* cited by examiner

BACK LIGHT UNIT COMPRISING SHAPE MEMORY MATERIAL AND DISPLAY APPARATUS COMPRISING THE SAME

TECHNICAL FIELD

The present disclosure relates to a display apparatus.

BACKGROUND ART

Display apparatuses are a type of output devices for displaying obtained or stored electrical information by converting the electrical information to visual information, and are used in various fields such as homes or work places.

There are many different display apparatuses such as monitor devices connected to personal computers (PCs) or server computers, portable computer systems, Global Positioning System (GPS) terminals, general television sets, Internet protocol televisions (IPTVs), portable terminals, e.g., smart phones, tablet PCs, personal digital assistants (PDAs), and cellular phones, any other display apparatus for reproducing images like advertisements or films, or other various kinds of audio/video systems.

The display apparatus may use many different display means to display still images or moving images for the user. The display means may include cathode-ray tubes (CRTs), Light Emitting Diodes (LEDs), Organic LEDs (OLEDs), Active-Matrix OLEDs, liquid crystals or electronic paper.

DISCLOSURE

Therefore, it is an aspect of the disclosure to provide a backlight unit with improved wrinkled phenomenon of optical sheet due to external factors such as temperature or humidity, and a display apparatus including the same.

In accordance with one aspect of the disclosure, a display apparatus includes: a backlight unit comprising an optical sheet; and an image forming unit configured to generate an image by transmitting or blocking light emitted from the backlight unit, and the optical sheet includes a plurality of sheets, and includes a shape memory material on at least one of the plurality of sheets.

The optical sheet may include a shape memory alloy or a shape memory polymer in at least one of the plurality of sheets.

The shape memory alloy may include Nitinol.

The shape memory material may be provided on the entire surface of the at least one sheet.

The shape memory material may be provided on an outer part of the surface of the at least one sheet.

The shape memory material may be provided on upper part and lower part of the surfaces of the at least one sheet.

The shape memory material may be provided on the right side part and the left side part of the surface of the at least one sheet.

In accordance with another aspect of the disclosure, a backlight unit includes: a light source; and an optical sheet provided so that the light emitted from the light source is incident, and the optical sheet includes a plurality of sheets, and comprises a shape memory material on at least one of the plurality of sheets.

The optical sheet may include at least one of a diffuser sheet, a prism sheet, a protective sheet, and a brightness enhancement sheet.

The optical sheet may include a shape memory alloy or a shape memory polymer in at least one of the plurality of sheets.

The shape memory alloy may include Nitinol.

The shape memory material may be provided on the entire surface of the at least one sheet.

The shape memory material may be provided on an outer part of the surface of the at least one sheet.

The shape memory material may be provided on upper part and lower part of the surfaces of the at least one sheet.

The shape memory material may be provided on the right side part and the left side part of the surface of the at least one sheet.

According to an aspect of the present disclosure, the wrinkled phenomenon of the optical sheet may be reduced by using a shape memory material for an optical sheet.

MODE OF THE INVENTION

Figure 1:
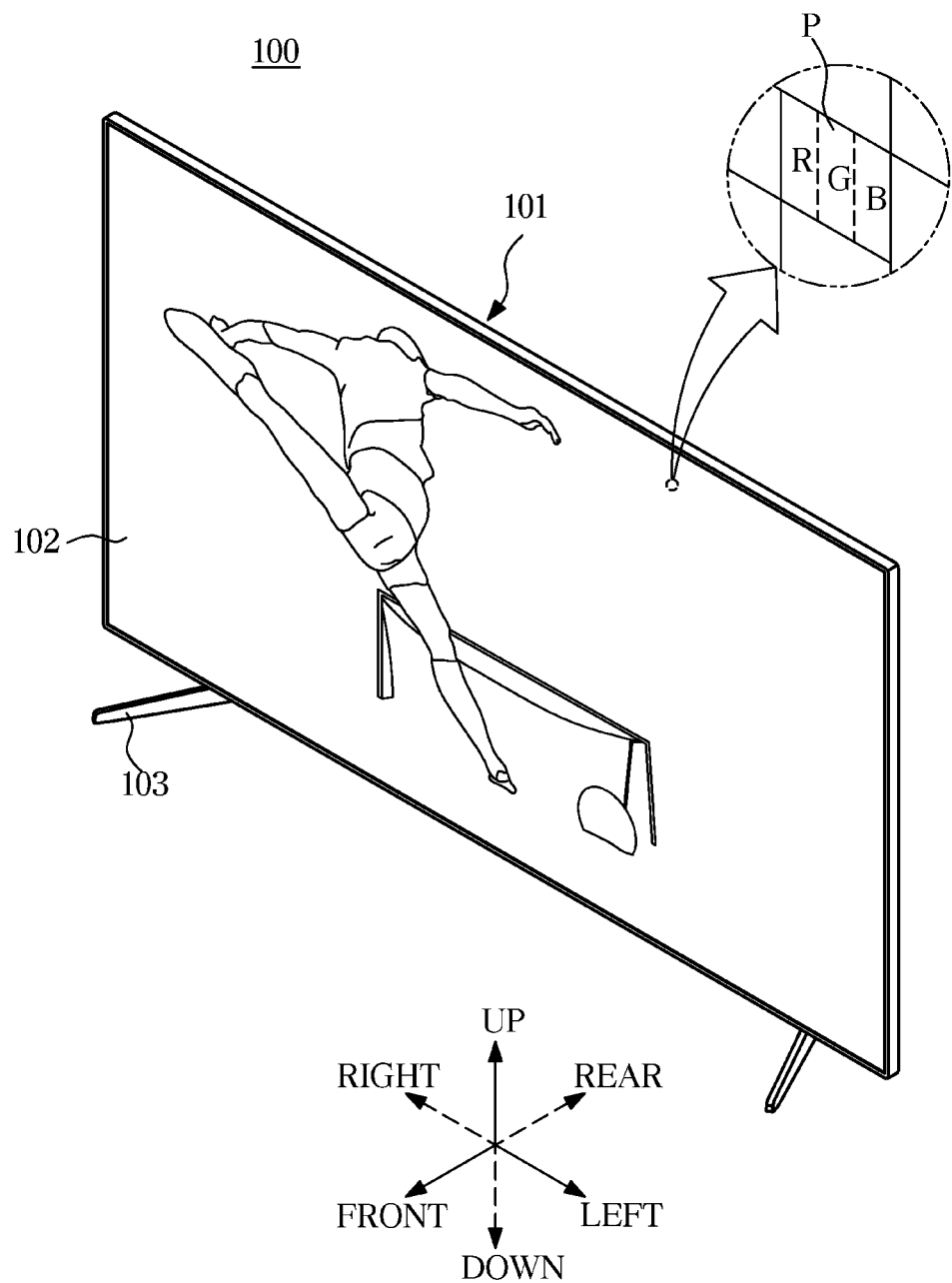
FIG. 1 is an exterior view of a display apparatus, according to an embodiment of the present disclosure.

Hereinafter, embodiments of the present disclosure will be described in detail with reference to the accompanying drawings.

Embodiments and features as described and illustrated in the present disclosure are only preferred examples, and various modifications thereof may also fall within the scope of the disclosure.

The terminology used herein is for the purpose of describing particular embodiments only and is not intended to limit the present disclosure.

As used herein, the singular forms "a", "an" and "the" are intended to include the plural forms as well, unless the context clearly indicates otherwise.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like 'first', 'second', etc., are used to tell one element from another, without limiting the elements.

Furthermore, the terms, such as part", block", member", module", etc., may refer to a unit of handling at least one function or operation. For example, the terms may refer to at least one process handled by hardware such as fieldprogrammable gate array (FPGA)/application specific integrated circuit (ASIC), etc., software stored in a memory, or at least one processor.

Embodiments of the present disclosure will now be described with reference to accompanying drawings. Throughout the drawings, like reference numerals may refer to like parts or components.

The term 'white light' herein used refers to a mixture of red light, green light, and blue light, or a mixture of blue light and yellow light. The term 'natural light' refers to light with all wavelengths combined in a region of visible rays.

FIG. 1 is an exterior view of a display apparatus, according to an embodiment of the present disclosure.

A display apparatus 100 is a device for processing image signals received from the outside and visually presenting the processed image. In the following description, it is assumed that the display apparatus 100 is a television (TV), but embodiments of the present disclosure are not limited thereto. For example, the display apparatus 100 may be implemented in various forms, such as a monitor, a portable multimedia device, a portable communication device, and any device that may visually present images.

As shown in FIG. 1, the display apparatus 100 may include a main body 101, a screen 102 for displaying an image, and a supporter 103 arranged under the main body 101 for supporting the main body 101.

The main body 101 forms the exterior of the display apparatus 100, and may include parts for the display apparatus 100 to display an image or perform various functions. Although the main body 101 of FIG. 1 is shaped like a flat plate, it is not limited thereto. For example, the main body 101 may have a curved form with left and right ends relatively coming forward and the other parts curved backward.

The screen 102 may be formed on the front of the main body 101 for displaying visual information, i.e., an image. For example, the screen may display still or moving images as two dimensional (2D) plane images or three dimensional (3D) stereographic images using binocular parallax.

A plurality of pixels P are formed on the screen 102, and an image to be displayed on the screen 102 may be formed by a combination of light emitted by the pixels P. Like a mosaic, a still image may be formed on the screen 102 by a combination of light emitted by the pixels P.

Each of the pixels P may emit light in various colors and brightness. For example, the plurality of pixels P may each have a red sub-pixel R, a green sub-pixel G, and a blue sub-pixel B to form an image in many different colors. The red sub-pixel R may emit red light of various levels of brightness; the green sub-pixel G may emit green light of various levels of brightness; the blue sub-pixel B may emit blue light of various levels of brightness. The red light has a wavelength in a range of about 620 nanometer (nm, which is one in a billion) to about 750 nm; the green light has a wavelength in a range of about 495 nm to about 495 nm; the blue light has a wavelength in a range of about 450 nm to about 495 nm.

By combinations of the red light of the red sub-pixel R, the green light of the green sub-pixel G, and the blue light of the blue sub-pixel B, each pixel P may produce various brightness and colors of light.

The supporter 103 may be installed under the main body 101 for supporting the main body 101 to stay in a stable position. Alternatively, the supporter 103 may be installed on the back of the main body 101 to fix the main body 101 onto the wall.

While the supporter 103 is shown to have a bar shape that protrudes forward from under the main body 101 in FIG. 1, it is not limited thereto, but may have any shape that may stably support the main body 101.

Figure 2:
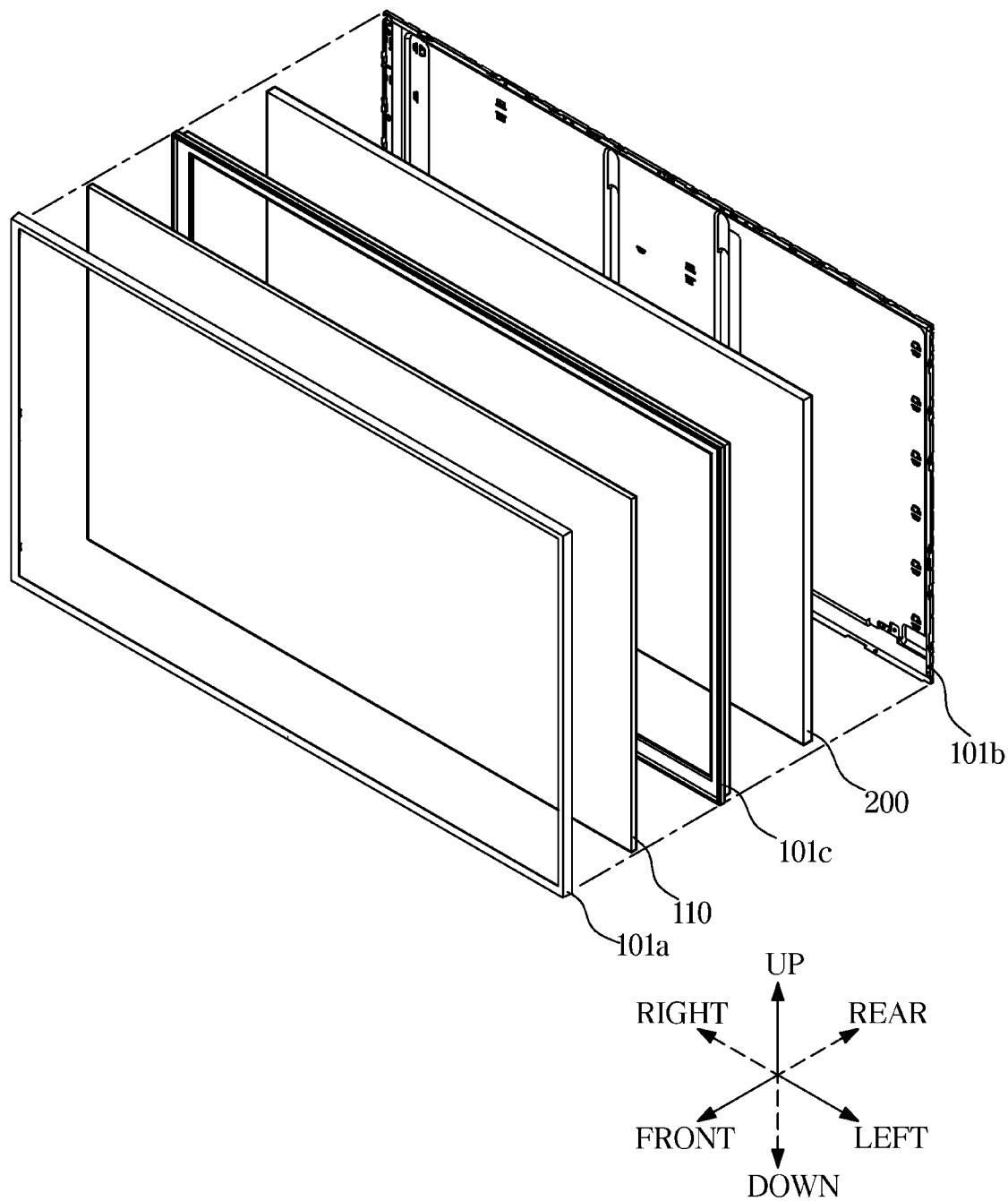
FIG. 2 is an exploded view of a display apparatus, according to an embodiment of the present disclosure.

FIG. 2 is an exploded view of a display apparatus, according to an embodiment of the present disclosure.

Referring to FIG. 2, the main body 101 may include many different kinds of components to generate an image on the screen 102. Specifically, the main body 101 may include a backlight unit 200 for emitting planar light, and an image forming unit 110 for creating an image by transmitting or blocking the light emitted from the back light unit 200.

The main body 101 may also include a front chassis 101a, a back chassis 101b, and a mold frame 101c to fix the image forming unit 110 and the backlight unit 200.

The front chassis 101a may have the form of a plate with an opening formed on the front. The user may see the image generated by the image forming unit 110 through the front opening of the front chassis 101a.

The back chassis 101b has the form of a box with an open front for receiving the image forming unit 110 and the backlight unit 200 of the display apparatus 100.

The mold frame 101c may be arranged between the front chassis 101a and the back chassis 101b. Especially, the mold frame 101c arranged between the front chassis 101a and the back light unit 200 may fix the image forming unit 110 and the back light unit 200.

The back light unit 200 may include a point light source for emitting monochromatic light or white light, and refract, reflect, and scatter light to convert the light emitted from the point light source to planar light. By the refraction, reflection, and scattering of light, the backlight unit 200 may emit uniform planar light forward.

Configuration and operation of the backlight unit 200 will be described in more detail below.

The image forming unit 110 is arranged in front of the backlight unit 200 for blocking or transmitting the light emitted from the backlight unit 200 to generate an image.

The front face of the image forming unit 110 constitutes the aforementioned screen 102 of the display apparatus 100, and is comprised of the plurality of pixels P.

Each of the plurality of pixels P included in the image forming unit 110 may independently block or transmit light from the backlight unit 200. The light transmitted by the plurality of pixels P may form an image displayed by the display apparatus 100.

The image forming unit 110 may employ a liquid crystal panel whose optical characteristics change by electric field.

As an example of the image forming unit 110, the liquid crystal panel will now be described.

Figure 3:
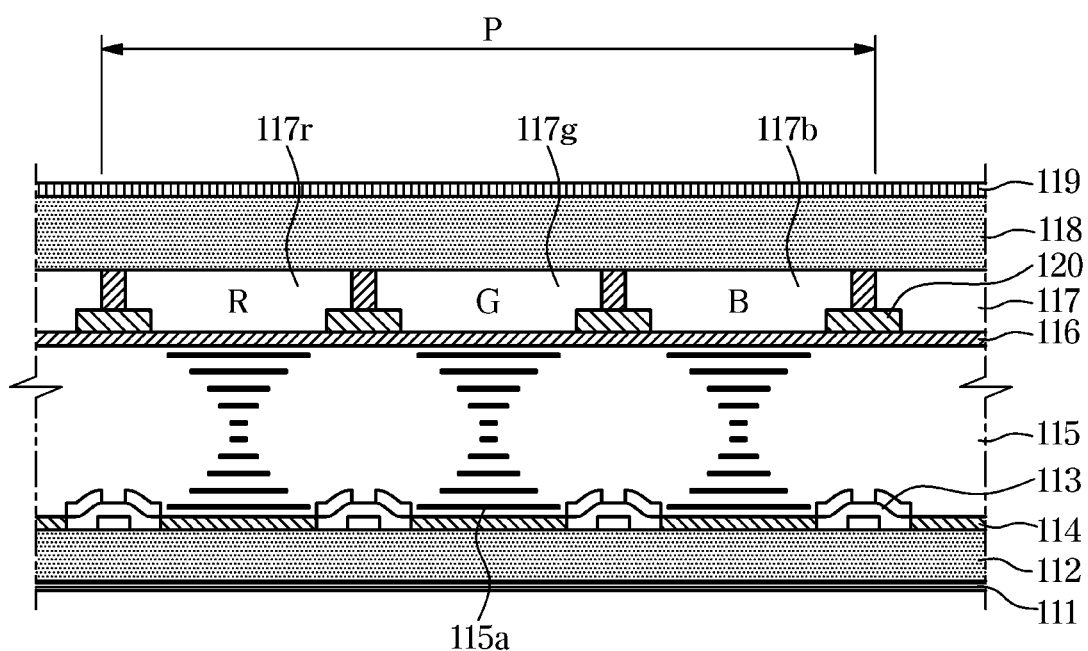
FIG. 3 is a side cross-sectional view of a pixel included in an image forming unit of a display apparatus, according to an embodiment of the present disclosure.

FIG. 3 is a side cross-sectional view of a pixel included in an image forming unit of a display apparatus, according to an embodiment of the present disclosure.

Referring to FIG. 3, the image forming unit 110 may include a first polarizer film 111, a first transparent substrate 112, a thin film transistor (TFT) 113, a pixel electrode 114, a liquid crystal layer 115, a common electrode 116, a color filter 117, a second transparent substrate 118, and a second polarizer film 119. In an embodiment of the present disclosure, the liquid crystal panel may be defined as including the first transparent substrate 112, the TFT 113, the pixel electrode 114, the liquid crystal layer 115, the common electrode 116, the color filter 117, and the second transparent substrate 118.

The first and second transparent substrates 112 and 118 form the exterior of the image forming unit 110, and protect the liquid crystal layer 115 and the color filter 117 arranged between the first and second transparent substrates 112 and 118. The first and second transparent substrates 112 and 118 may be formed of tempered glass or transparent resin.

On the outer surfaces of the first and second transparent substrates 112 and 118, the first and second polarizer films 111 and 119 are applied, respectively.

Light has a pair of electric field and magnetic field oscillating in different directions perpendicular to a traveling direction of light. The directions of oscillation of the electric and magnetic fields may be any different directions perpendicular to the traveling direction of light. The phenomenon that an electric field or a magnetic field oscillates in only a particular direction is called polarization, and a film that transmits light having an electric or magnetic field oscillating in a predetermined direction while blocking light having an electric or magnetic field oscillating in a direction other than the predetermined direction is called a polarizer film. In other words, the polarizer film transmits light oscillating in a predetermined direction but blocks light oscillating in other directions.

The first polarizer film 111 transmits light having an electric or magnetic field oscillating in a first direction while blocking other light. The second polarizer film 119 transmits light having an electric or magnetic field oscillating in a second direction while blocking other light. The first and second directions are perpendicular to each other. In other words, a polarization direction of light transmitted by the first polarizer film 111 and an oscillation direction of light transmitted by the second polarizer film 119 are perpendicular to each other. As a result, the light in general may not penetrate both the first and second polarizer films 111 and 119 at the same time.

The color filter 117 may be arranged on the inner side of the second transparent substrate 118.

The color filter 117 may include a red color filter 117*r* for transmitting red light, a green color filter 117*g* for transmitting green light, and a blue color filter 117*b* for transmitting blue light, and the red, green, blue color filters 117*r*, 117*g*, and 117*b* may be arranged parallel to each other. The color filter 117 may also include a black matrix for preventing interference of colors between the red, green, and blue color filters 117*r*, 117*g*, and 117*b*, and blocking the light from the backlight unit 200 from leaking out to the other parts than the red, green, and blue color filters 117*r*, 117*g*, and 117*b*. The black matrix 120 is located between the red, green, and blue color filters 117*r*, 117*g*, and 117*b*.

The area, in which the color filter 117 is formed, corresponds to the pixel P as described above. Furthermore, the area where the red color filter 117*r* is formed corresponds to the red sub-pixel R; the area where the green color filter 117*g* is formed corresponds to the green sub-pixel G; the area where the blue color filter 117*b* is formed corresponds to the blue sub-pixel B. In other words, the red, green, and blue color filters 117*r*, 117*g*, and 117*b* form the red, green, and blue sub-pixels R, G, and B, respectively, and the combination of the red, green, and blue color filters 117*r*, 117*g*, and 117*b* form the pixel P.

On the inner side of the first transparent substrate 112, the TFTs 113 are formed.

Specifically, the TFTs 113 may be formed at corresponding locations between the red, green, and blue color filters 117*r*, 117*g*, and 117*b*. In other words, the TFTs 113 may be located between the red, green, and blue sub-pixels R, G, and B.

The TFT 113 may pass or block current flowing in the pixel electrode 114, which will be described below. Specifically, depending on whether to turn on (closing) or turn off (opening) the TFT 113, an electric field may be formed or removed from between the pixel electrode 114 and the common electrode 116. The TFT 113 may be formed of poly-silicon, and manufactured using a semiconductor process, such as lithography, deposition, or ion implantation process.

The pixel electrode 114 may be formed on the inner side of the TFT 113 of the first transparent substrate 112, and the common electrode 116 may be formed on the inner side of the color filter 117 of the second transparent substrate 118.

The pixel electrode 114 and the common electrode 116 are formed of a conductive metal material, and may produce an electric field to change arrangement of molecules of the liquid crystal layer 115, which will be described below.

In this regard, the pixel electrode 114 may be formed in the regions corresponding to the red, green, and blue color filters 117*r*, 117*g*, and 117*b*. As a result, electric fields may be selectively produced in the regions corresponding to the red, green, and blue color filters 117*r*, 117*g*, and 117*b* on the liquid crystal layer 115, which will be described later.

The pixel electrode 114 and the common electrode 116 may include a transparent material to transmit light incident from outside. The pixel electrode 114 and the common electrode 116 may also be formed of indium tin oxide (ITO), indium zinc oxide (IZO), silver (Ag) nano wire, carbon nano tube (CNT), graphene, or 3,4-ethylenedioxythiophene (PEDOT).

The liquid crystal layer 115 is formed between the pixel electrode 114 and the common electrode 116, and includes liquid crystal molecules 115*a*.

The liquid crystal is in an intermediate state between solid (crystal) and fluid. When heat is applied, ordinary materials are changed from a solid state to a transparent liquid state at a temperature above their melting points. By contrast, when heat is applied to a liquid crystal substance in a solid state, the liquid crystal substance changes to an opaque and muddy liquid and then into a transparent liquid state. The term liquid crystal refers to a liquid crystal state, which is an intermediate state between solid and fluid, or to a material itself in the liquid crystal state.

Most liquid crystal materials are organic compounds, the molecules of which are shaped like thin and long rods, and the arrangement of the molecules are irregular in a direction and regular in another direction. As a result, the liquid crystal has both fluidity of a liquid and optical anisotropy of a crystal (solid).

Furthermore, the liquid crystal reveals an optical property according to a change in electric field. For example, the liquid crystal may have different arrangement of molecules that form the liquid crystal, according to a change in electric field. If an electric field is produced in the liquid crystal layer 115, the liquid crystal molecules 115*a* of the liquid crystal layer 115 are arranged along the direction of the electric field, and otherwise if no electric field is produced in the liquid crystal layer 115, the liquid crystal molecules 115*a* may be arranged irregularly or arranged along the alignment layer (not shown).

As a result, the optical property of the image forming unit 110 may be changed according to the presence of an electric field in the liquid crystal layer 115.

For example, if no electric field is produced in the liquid crystal layer 115, the light polarized by the first polarizer film 111 may penetrate the second polarizer film 119 due to the arrangement of the liquid crystal molecules 115*a* of the liquid crystal layer 115. In other words, the light from the pixel P on which no electric field is produced in the liquid crystal layer 115 may penetrate the image forming unit 110.

On the contrary, if an electric field is produced in the liquid crystal layer 115, the light polarized by the first polarizer film 111 may not penetrate the second polarizer film 119 due to the arrangement of the liquid crystal molecules 115a of the liquid crystal layer 115. In other words, the light from the pixel P on which an electric field is produced in the liquid crystal layer 115 may be blocked by the image forming unit 110.

As described above, the image forming unit 110 may independently control light penetration of each pixel P (more specifically, red, green, and blue sub-pixels included in the pixel P). As a result, by combinations of rays from the plurality of pixels P, an image may be displayed on the screen 102 of the display apparatus 100.

The backlight unit 200 will now be described.

The backlight unit 200 may be classified into a direct-type backlight unit and an edge-type backlight unit depending on the location of the light source.

Figure 4:
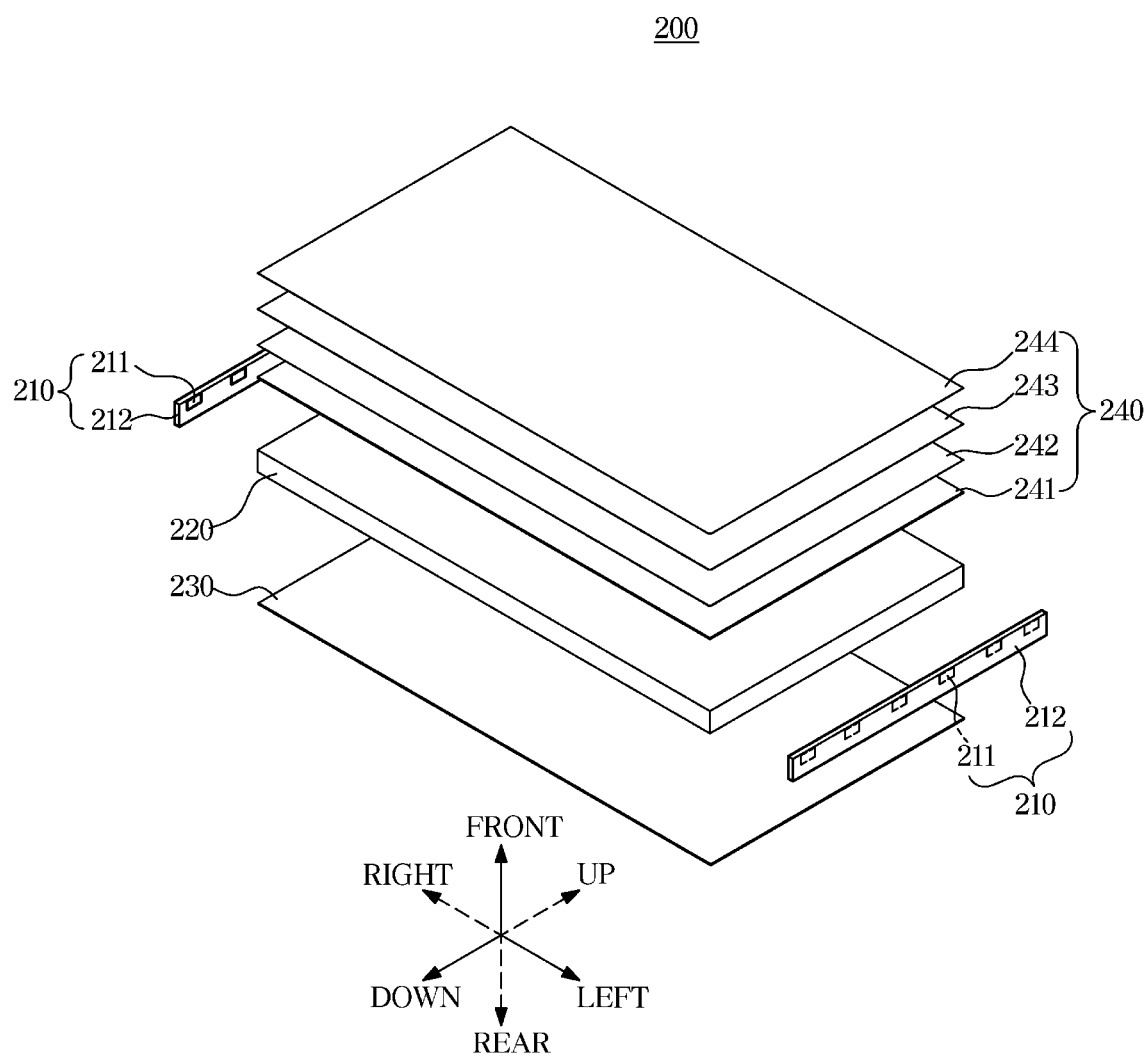
FIG. 4 is an exploded view of a backlight unit, according to an embodiment of the present disclosure.
Figure 5:
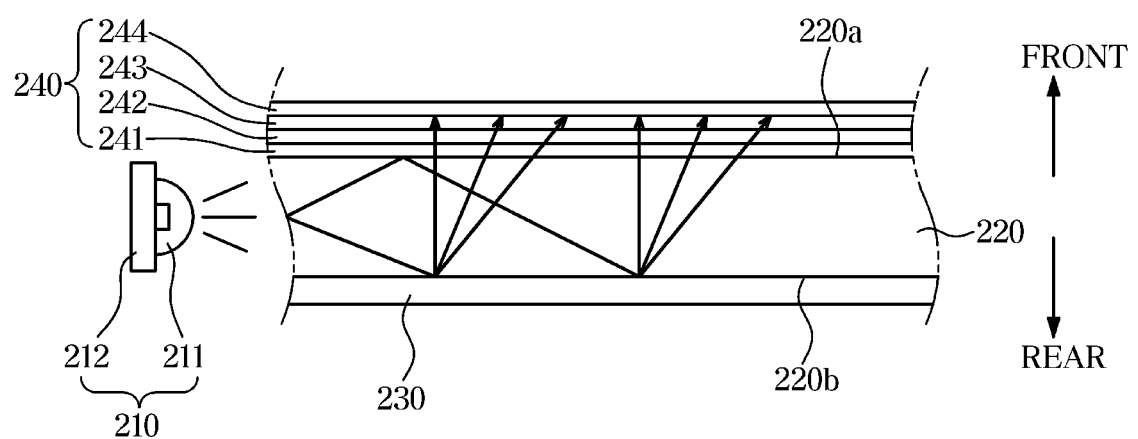
FIG. 5 is a side cross-sectional view of a backlight unit, according to an embodiment of the present disclosure.
Figure 6:
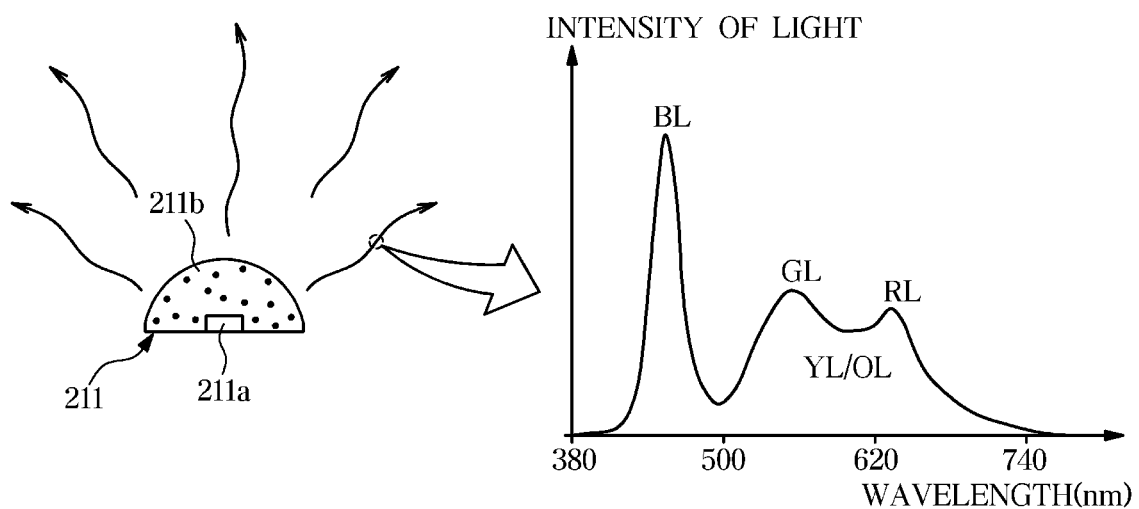
FIG. 6 shows a spectrum of light emitted from a light source included in a backlight unit, according to an embodiment of the present disclosure.

FIG. 4 is an exploded view of a backlight unit, according to an embodiment of the present disclosure, and FIG. 5 is a side cross-sectional view of a backlight unit, according to an embodiment of the present disclosure. FIG. 6 shows a spectrum of light emitted from a light source included in a backlight unit, according to an embodiment of the present disclosure.

Referring to FIGS. 4, 5, and 6, the edge-type backlight unit 200 may include a light emitting module 210 for generating light, a light guide 220 for scattering light, a reflective sheet 230 for reflecting light, and an optical sheet 240 for improving light brightness.

The light emitting module 210 may include a plurality of light sources 211 for emitting light, and a supporting body 212 for supporting/fixing the plurality of light sources 211.

The plurality of light sources 211 may be uniformly located on either side of the backlight unit 200, as shown in FIG. 4, and may emit light toward the center of the backlight unit 200.

The plurality of light sources 211 may be arranged at regular intervals so that the light emitted from them has as uniform brightness as possible. For example, as shown in FIG. 4, the plurality of light sources 211 may be arranged at regular intervals on the left and right sides of the backlight unit 200. The arrangement of the light sources 211 is not, however, limited to what is shown in FIG. 4. For example, the light sources 211 may be arranged one of the left and right sides of the backlight unit 200.

The light sources 211 may employ devices capable of emitting monochromatic light (light having a particular wavelength, e.g., blue light) or white light (light with a mixture of various wavelengths) to various directions when powered. For example, the light sources 211 may employ low calorific light emitting diodes (LEDs) or Cold Cathode Fluorescent Lamps (CCFL).

Especially, the light source 211 may include a blue LED 211a for emitting high energy light, blue light, and a phosphor 211b for absorbing blue light and emitting green and red light, as shown on the left of FIG. 6.

The blue LED 211a of the light source 211 may be manufactured from an indium gallium nitride compound (InGaN) prepared by adding indium (In) to a gallium nitride compound (GaNO).

The phosphor 211b may convert energy absorbed from outside into visible rays, and emit the visible rays. The phosphor 211b may include a yellow phosphor (YAG), a KSF phosphor ($K_2SiF_6$), or a KTF phosphor ($K_2SiF_6$).

The light source 211 may emit blue light BL having a wavelength of about 450 nm, green light GL having a wavelength of about 535 nm, and red light RL having a wavelength of about 620 nm. However, the light source 211 emits not only the blue light BL, green light GL, and red light RL, but also, as illustrated on the right of FIG. 6, yellow light YL or orange light OL.

The supporting body 212 may fix the plurality of light sources 211 to prevent the light sources 211 from being moved. In addition, the supporting body 212 may supply power to each of the light sources 211 for light emission.

The supporting body 212 may be located on the side of the backlight unit 200 along with the light sources 211. For example, as illustrated in FIG. 4, the supporting body 212 may be arranged on each of the left and right sides of the back light unit 200. However, the arrangement of the supporting body 212 is not limited to what is shown in FIG. 4. For example, the support body 212 may be located one of the left and right sides of the back light unit 200. The supporting body 212 may be formed of a synthetic resin with conductive power supply lines formed therein or a printed circuit board (PCB) to fix the plurality of light sources 211 and supply power to the light sources 211.

The light guide plate 220 changes the traveling direction of light incident from the light emitting module 210 on the side and emits the light forward. The light guide plate 220 also scatters the light incident from the light emitting module 210 on the side to be emitted toward the front face 220a of the light guide plate 220.

To change the light traveling direction, a plurality of swollen stripes may be formed on the front face 220a of the light guide plate 220, and a plurality of dots may be formed on the rear face 220b of the light guide plate 220. The sizes and intervals of the swollen stripes and dots may be adjusted to emit uniform light in the forward direction of the light guide plate 220. Furthermore, the swollen stripes on the front face 220a of the light guide plate 220 may be embossed through a printing method, and the dots on the rear face 220b of the light guide plate 220 may be formed in intaglio with laser beams.

As described above, since the light emitting module 210 is arranged on the side of the backlight unit 200, the position of the light emitting module 210 may cause non-uniform brightness. Accordingly, to eliminate the non-uniformity of brightness due to the position of the light emitting module 210, diffusion of the light emitted from the light emitting module 210 inside the light guide plate 220 may be required. For example, to diffuse the light, the light guide plate 220 may have a milk color.

The light incident onto the light guide plate 220 may travel in various directions inside the light guide plate 220 depending on the incidence angle. For example, as shown in FIG. 5, the light incident onto the front face 220a of the light guide plate 220 may be reflected on the front face 220a of the light guide plate 220 and may travel toward the rear face 220b, or refracted at the front face 220a of the light guide plate 220 to be incident upon the optical sheet 240. The light incident onto the rear face 220b of the light guide plate 220 may be reflected on the rear face 220b of the light guide plate 220, or scattered by the dots on the rear face 220b of the light guide plate 220 to travel toward the front face 220a.

Due to the reflection of light that occurs on the front and rear faces 220a and 220b of the light guide plate 220, the light incident onto the side of the light guide plate 220 may travel to the center of the light guide plate 220. Due to the scattering of light that occurs on the rear face 220b of the light guide plate 220 and the refraction of light that occurs on the front face 220a of the light guide plate 220, the light inside the light guide plate 220 may emit through the front face 220a of the light guide plate 220.

The light guide plate 220 may employ poly-methyl methacrylate (PMMA) or transparent polycarbonate (PC).

The reflective sheet 230 is located behind the light guide plate 220 for reflecting light emitted through the back face 220b of the light guide plate 220 toward the light guide plate 220.

The reflective sheet 230 may be manufactured by coating a highly reflective material on a base material. For example, the reflective sheet 230 may be manufactured by coating a polymer having a high reflectivity on a base material of polyethylene terephthalate (PET), or the like.

An optical sheet 240 may include various sheets to improve brightness and uniformity of the brightness. For example, the optical sheet 240 may include a diffuser sheet 241, a prism sheet 242, a protective sheet 243, and a brightness enhancement sheet 244.

The diffuser sheet 241 diffuses light to improve uniformity of brightness. Light emitted from the light sources 211 may be diffused by the light guide plate 220 and further diffused by the diffuser sheet 241 included in the optical sheet 240.

In another embodiment, instead of the diffuser sheet 241, a microlens sheet that diffuses light and widens the viewing angle like the diffuser sheet 241 may be used.

The light that has passed through the diffuser sheet 241 is diffused in a direction parallel to the diffuser sheet 241, thereby reducing brightness.

The prism sheet 242 may focus the light diffused by the diffuser sheet 241, thereby improving the brightness.

The prism sheet 242 may have triangular prism patterns, which are arranged next to each other to form a plurality of bands. The prism sheet may include a first prism sheet and a second prism sheet. In this case, the directions of arrangement of prism patterns of the first and second prism films 242 may be orthogonal to each other.

Light penetrating the prism sheet 242 has a viewing angle of about 70 degrees and travels to the front of the backlight 200, thereby improving brightness.

The protective sheet 243 protects various constituent parts included in the backlight unit 200 from external impact or inflow of foreign substances. In particular, the prism sheet 242 is susceptible to scratches, and the protective sheet 243 may prevent the prism sheet 242 from being scratched.

The brightness enhancement sheet 244 is a kind of polarizing film and is also referred to as a reflective polarizing film. The brightness enhancement sheet 244 may transmit some of the incident rays while reflecting the others to improve brightness. For example, the brightness enhancement sheet 244 may transmit light in a predetermined polarization direction and reflect light in the other directions. A polarization direction of the brightness enhancement sheet 244 may be the same as that of the first polarizer film 111 as described above. As a result, the light penetrating the brightness enhancement sheet 244 may also penetrate the first polarizer film 111 included in the image forming unit 110.

The light reflected by the brightness enhancement sheet 244 may be recycled inside the backlight unit 200, and this recycling of light may improve brightness of the display apparatus 100.

The optical sheet 240 is not limited to the sheets or films as illustrated in FIG. 5, and may further include various other sheets or films.

Figure 7:
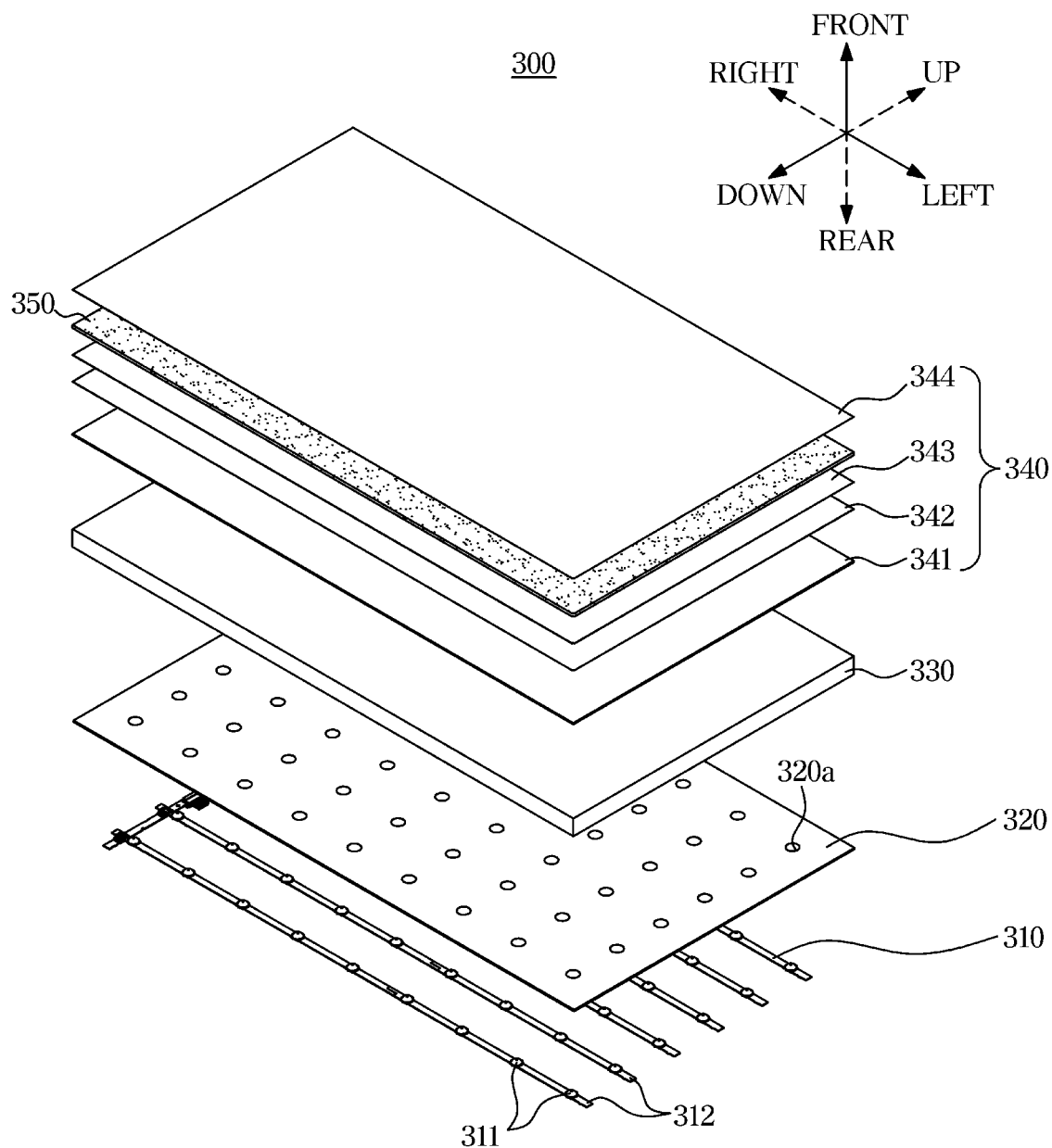
FIG. 7 is an exploded view of a backlight unit according to another embodiment of the present disclosure.
Figure 8:
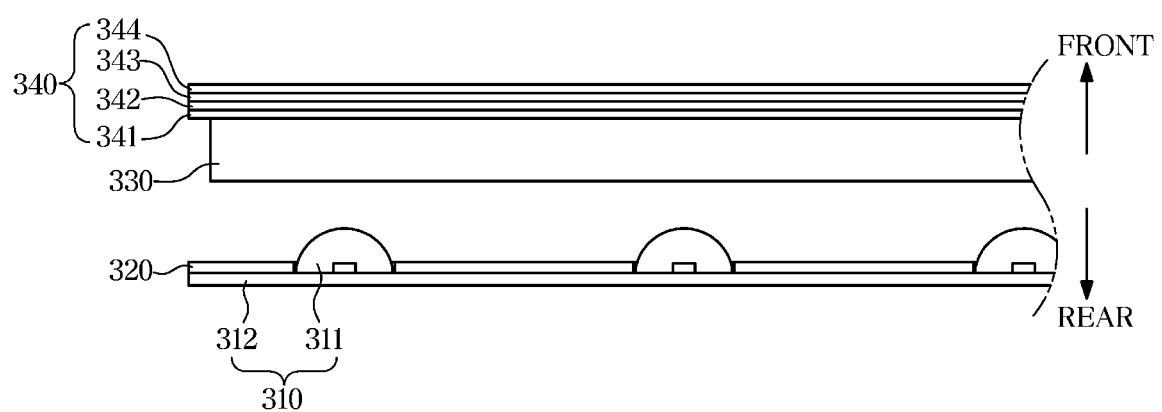
FIG. 8 is a side-sectional view of a backlight unit according to another embodiment of the present disclosure.

FIG. 7 is an exploded view of a backlight unit according to another embodiment of the present disclosure. FIG. 8 is a side-sectional view of a backlight unit according to another embodiment of the present disclosure.

Referring to FIGS. 7 and 8, the direct-type backlight unit 300 includes a light emitting module 310 generating light, a reflective sheet 320 for reflecting light, and a diffuser plate 330 for dispersing light, and an optical sheet 340 for improving light brightness.

The light emitting module 310 may include a plurality of light sources 311 for emitting light, and a supporting body 312 for supporting/fixing the plurality of light sources 311.

The plurality of light sources 311 may be uniformly arranged at the rearmost side of the backlight unit 300 as shown in FIG. 7 and may emit light toward the front.

The plurality of light sources 311 may be arranged in a predetermined pattern so that the light emitted from the plurality of light sources 311 has as uniform brightness as possible. Specifically, a plurality of light sources 311 may be arranged so that the distance between one light source and adjacent light sources is the same. For example, as shown in FIG. 7, rows and columns of a plurality of light sources may be aligned so that a square is formed by four adjacent light sources. However, the pattern in which the plurality of light sources 311 are arranged is not limited to the pattern described above, and the plurality of light sources 311 may be arranged in various patterns so that the light emitted from the plurality of light sources 311 has as uniform brightness as possible.

The light sources 311 may employ devices capable of emitting monochromatic light (light having a particular wavelength, e.g., blue light) or white light (light with a mixture of various wavelengths) to various directions when powered.

The supporting body 312 may fix the plurality of light sources 311 to prevent the light sources 311 from being moved. In addition, the supporting body 312 may supply power to each of the light sources 311 for light emission.

In addition, a plurality of support bodies 312 may be provided according to the arrangement of the plurality of light sources 311. For example, as shown in FIG. 7, when a plurality of light sources 311 are arranged in rows, the support body 312 is provided with the same number as the row of the plurality of light sources 311, and each of the plurality of support bodies 312 may fix a plurality of light sources 311 belonging to the same row. The supporting body 312 may be formed of a synthetic resin with conductive power supply lines formed therein or a printed circuit board (PCB) to fix the plurality of light sources 311 and supply power to the light sources 311.

The reflective sheet 320 is provided in front of the light emitting module 310, and may reflect light traveling toward the rear forward or in a direction close to the front.

A plurality of through holes 320a are formed in the reflective sheet 320 at positions corresponding to the plurality of light sources 311. In addition, the light source 311 may pass through the through hole 320a and protrude in front of the reflective sheet 320 as shown in FIG. 8.

The reflective sheet 320 may be manufactured by coating a highly reflective material on a base material. For example, the reflective sheet 320 may be manufactured by coating a polymer having a high reflectivity on a base material of polyethylene terephthalate (PET), or the like.

The diffuser plate 330 may be provided in front of the light emitting module 310 and the reflective sheet 320, and may evenly distribute the light emitted from the light source 311.

Although the light source 311 is arranged in an equal distance, non-uniformity of brightness may occur depending on the position of the light source 311. The diffuser plate 330 may diffuse light emitted from the light source 311 within the diffuser plate 330 in order to remove non-uniformity in brightness due to the light source 311. In other words, the diffuser plate 330 may receive non-uniform light from the light source 311 and emit uniform light to the entire surface.

The diffuser plate 330 may employ poly methyl methacrylate (PMMA) or polycarbonate (PC) to which a diffusion agent for light diffusion is added.

The optical sheet 340 may include various sheets for improving brightness and uniformity of brightness. For example, the optical sheet 340 may include a diffuser sheet 341, a prism sheet 342, a protective sheet 343, and a brightness enhancement sheet 344. Since the description of the optical sheet 340 is the same as the description of the optical sheet 240 described above, it will be omitted.

On the other hand, as the backlight unit becomes larger, the optical sheet is partially or entirely wrinkled due to the influence of temperature or humidity. When the optical sheet becomes wrinkled, a problem may occur in that the sheet that becomes wrinkled on the display screen is visually recognized. The disclosed embodiment provides a backlight unit and a display apparatus including the same, which uniformly transmits a light without screen abnormalities by preventing the optical sheet from becoming wrinkled by using a shape memory material. Hereinafter, an optical sheet using a shape memory material will be described in detail.

Figure 9:
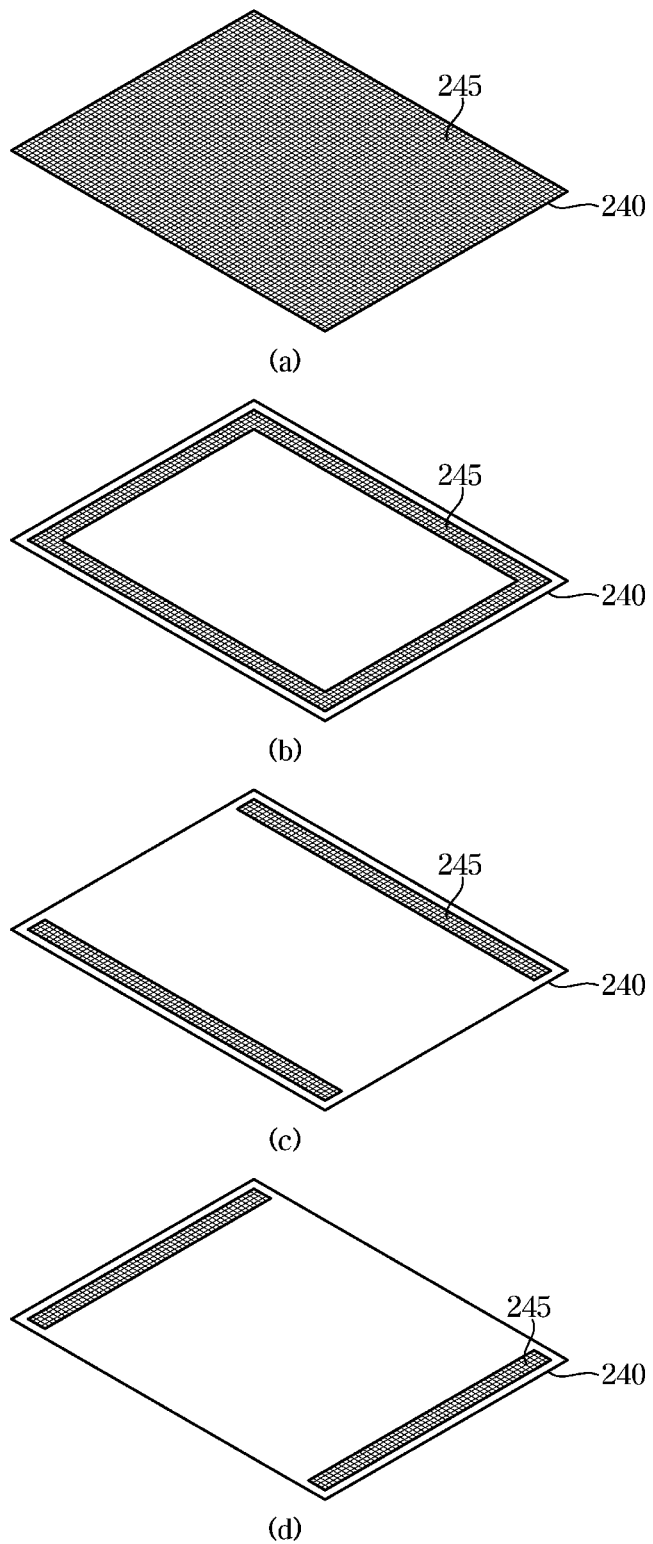
FIG. 9 shows an optical sheet using a shape memory material according to an embodiment of the present disclosure.

FIG. 9 shows an optical sheet using a shape memory material according to an embodiment of the present disclosure. First, a shape memory material used in the optical sheet of the disclosed embodiment will be described. The optical sheet according to the disclosed embodiment includes a shape memory polymer or a shape memory alloy.

The shape memory effect (SME) is a phenomenon that remembers a shape stored at a constant temperature, transforms it into a completely different shape by applying force, and then returns to the original shape when heated. Materials exhibiting such a shape memory effect can be classified into a shape memory alloy (SMA) and a shape memory polymer (SMP) depending on the material.

The shape memory alloy according to the disclosed embodiment may include a nickel-titanium alloy (nitinol), a copper-zinc alloy, a gold-cadmium alloy, an indium-thallium alloy, and the like according to the type of the alloy.

The shape memory alloy according to the disclosed embodiment may include nitinol, which is a nickel-titanium alloy, and other shape memory alloys may be used depending on the temperature at which the shape memory effect is required.

In shape memory alloys, the shape memory effect is caused by phase transformation at a specific temperature. That is, in the shape memory alloy, the crystal arrangement changes into a high temperature phase (austenitic phase) and a low temperature phase (martensitic phase) depending on the external temperature. In the low temperature phase, even if the shape is deformed, it is restored to its original shape by heating it above a certain temperature.

On the other hand, shape memory polymers can be classified into physical crosslinking and chemical crosslinking according to the type of crosslinking. The chemically crosslinked shape memory polymer becomes a thermosetting resin, and the physically crosslinked polymer becomes a thermoplastic resin.

As an example of a thermoplastic shape memory polymer, a polyurethane shape memory polymer has a high shape recovery power (maximum recovery strain of 400% or more), a wide shape recovery temperature range (30 degrees to 70 degrees), and good workability.

As an example of a thermosetting shape memory polymer, an epoxy shape memory polymer has a shape memory recovery ratio of 98 to 100%, an elastic modulus of 2 to 4.5 GPa, and is stable against moisture.

The shape memory polymer according to the disclosed embodiment may include the above-described shape memory polymer, but is not limited thereto and may include various known shape memory polymers.

The above-described optical sheet may include any one or more of polymethyl methacrylate (PMMA), polyethylene terephthalate (PET), polypropylene (PP), polyethylene (PE), and polycarbonate (PC) as a base film.

The optical sheet according to the disclosed embodiment may be implemented as a base film in which shape memory polymer or shape memory alloy is added to such a material. An optical film can be manufactured by processing a pattern on an optical film containing shape memory polymer or shape memory alloy.

When the shape memory material is added to the base film, as shown in (a) of FIG. 9, the shape memory material may be added over the entire surface of the optical sheet to cover the entire surface of the optical sheet. As another example, as shown in (b) of FIG. 9, the shape memory material may be added along the outer portion of the optical sheet to cover the outer portion of the optical sheet. As shown in (c) and (d) of FIG. 9, the shape memory material may be added to the upper and lower portions or left and right of the optical sheet. The position or shape of the shape memory material added to the optical sheet is not limited to the example shown in FIG. 9, and may be added to various other positions of the optical sheet in various forms.

As described above, the optical sheet may include a diffuser sheet, a prism sheet, a protective sheet, and a brightness enhancement sheet. The shape memory material may be added to at least one of the plurality of sheets constituting the optical sheet as shown in FIG. 9.

That is, the shape memory material may be added to all sheets constituting the optical sheet, or may be added to one or more sheets constituting the optical sheet according to the characteristics of the display apparatus.

In addition, since the optical sheet according to the disclosed embodiment may include other sheets in addition to the above-described sheets, if other types of sheets not mentioned above are employed in the optical sheet, the shape memory material may be added to the other types of sheets.

When the backlight unit is operated while the optical sheet is wrinkled due to temperature, humidity or other external factors, heat is generated from a light source or power, and the temperature inside the panel rises. In addition, this heat source affects the shape memory material included in the optical sheet, so that the shape memory material recovers its original shape, thereby removing the wrinkles of the sheet. Alternatively, as described above, before the sheet is wrinkled, the shape memory material recovers and maintains its original shape by a heat source inside the panel, so that the sheet can be prevented from wrinkled.

In the above, one embodiment of the disclosed invention has been illustrated and described, but the disclosed invention is not limited to the specific embodiment described above, and various modifications can be implemented by those of ordinary skill in the technical field to which the disclosed invention belongs without departing from the subject matter claimed in the claims, these variations cannot be understood separately from the disclosed invention.

The invention claimed is:

1. A display apparatus comprising:
a backlight unit comprising an optical sheet; and
an image forming unit configured to generate an image by transmitting or blocking light emitted from the backlight unit, and
wherein the optical sheet comprises a plurality of sheets, and comprises a shape memory material on at least one sheet of the plurality of sheets, and
wherein the shape memory material is provided on an entire surface of the at least one sheet.

2. The display apparatus according to claim 1, wherein the optical sheet comprises a shape memory alloy or a shape memory polymer on at least one of the plurality of sheets.

3. The display apparatus according to claim 2, wherein the shape memory alloy comprises Nitinol.

4. A backlight unit comprising:
a light source; and
an optical sheet provided so that light emitted from the light source is incident thereon, and
wherein the optical sheet comprises a plurality of sheets, and comprises a shape memory material on at least one sheet of the plurality of sheets, and
wherein the shape memory material is provided on an entire surface of the at least one sheet.

5. The backlight unit according to claim 4, wherein the optical sheet comprises at least one of a diffuser sheet, a prism sheet, a protective sheet, and a brightness enhancement sheet.

6. The backlight unit according to claim 4, wherein the optical sheet comprises a shape memory alloy or a shape memory polymer on at least one of the plurality of sheets.

7. The backlight unit according to claim 6, wherein the shape memory alloy comprises Nitinol.

* * * * *